United States Patent
Ho et al.

(10) Patent No.: US 7,512,703 B2
(45) Date of Patent: Mar. 31, 2009

(54) METHOD OF STORING DATA CONCERNING A COMPUTER NETWORK

(75) Inventors: Yong Boon Ho, Fort Collins, CO (US); Srikanth Natarajan, Fort Collins, CO (US); Dipankar Gupta, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 824 days.

(21) Appl. No.: 10/355,118

(22) Filed: Jan. 31, 2003

(65) Prior Publication Data

US 2004/0153568 A1 Aug. 5, 2004

(51) Int. Cl.
*G06F 15/173* (2006.01)
(52) U.S. Cl. ...................................... 709/238
(58) Field of Classification Search ................. 709/238, 709/220, 223
See application file for complete search history.

(56) References Cited

U.S. PATENT DOCUMENTS

| | | | |
|---|---|---|---|
| 5,101,348 A * | 3/1992 | Arrowood et al. ........... 709/242 |
| 5,297,138 A * | 3/1994 | Black .......................... 370/254 |
| 5,606,664 A * | 2/1997 | Brown et al. ................. 709/224 |
| 5,606,669 A * | 2/1997 | Bertin et al. ................. 709/223 |
| 5,708,772 A * | 1/1998 | Zeldin et al. ................... 714/25 |
| 5,727,157 A * | 3/1998 | Orr et al. ..................... 709/224 |
| 5,737,319 A * | 4/1998 | Croslin et al. ............... 370/255 |
| 5,850,397 A * | 12/1998 | Raab et al. ................... 370/392 |
| 5,881,050 A * | 3/1999 | Chevalier et al. ........... 370/230 |
| 5,933,416 A * | 8/1999 | Schenkel et al. ............ 370/254 |
| 5,948,055 A * | 9/1999 | Pulsipher et al. ............ 709/202 |
| 5,968,176 A * | 10/1999 | Nessett et al. ................. 726/11 |
| 6,154,587 A * | 11/2000 | Okayama ..................... 385/24 |
| 6,246,689 B1 * | 6/2001 | Shavitt ........................ 370/406 |
| 6,262,974 B1 * | 7/2001 | Chevalier et al. ........... 370/232 |
| 6,333,918 B1 * | 12/2001 | Hummel ...................... 370/238 |
| 6,373,820 B1 * | 4/2002 | Kim ............................. 370/250 |
| 6,385,201 B1 * | 5/2002 | Iwata .......................... 370/400 |
| 6,675,209 B1 * | 1/2004 | Britt ............................ 709/224 |
| 6,697,338 B1 * | 2/2004 | Breitbart et al. ............. 370/254 |
| 6,944,674 B2 * | 9/2005 | Frelechoux et al. ......... 709/238 |
| 6,968,376 B2 * | 11/2005 | Horie et al. ................. 709/224 |
| 2004/0151121 A1 | 8/2004 | Natarajan et al. |
| 2004/0153572 A1 | 8/2004 | Walker et al. |
| 2004/0156321 A1 | 8/2004 | Walker et al. |

* cited by examiner

*Primary Examiner*—David Y Eng

(57) ABSTRACT

A system and associated method of storing data concerning a computer network are disclosed. Mesh information concerning a mesh of nodes in the computer network is produced. The mesh information indicates that an interface of the mesh is an external mesh interface, and the mesh information is stored.

45 Claims, 5 Drawing Sheets

METHOD OF STORING DATA CONCERNING A COMPUTER NETWORK

RELATED APPLICATIONS

The present application is related to the U.S. applications "METHOD OF DETERMINING A MESH IN A COMPUTER NETWORK", Walker et al., Ser. No. 10/355,062, "METHOD OF DETERMINING A MAXIMAL MESH", Natarajan et al., Ser. No. 10/354,991, and "METHOD OF INDICATING A PATH IN A COMPUTER NETWORK", Walker et al., Ser. No. 10/355,002. Each of these applications is filed on the same day as the present application and is incorporated herein by reference.

BACKGROUND

Computer networks such as local area networks (LANs) and metropolitan area networks (MANs) can be complex to run and manage. Network management software applications can be used to help manage these computer networks. The network management software applications can show the network topology and indicate failures in the network. An example of a network management software application is the Hewlett-Packard OpenView Network Node Manager (NNM) product.

To produce a display in a network management software application, data from nodes in the computer network is obtained. A management protocol, such as the Simple Network Management Protocol (SNMP), can be used to obtain information from the nodes in the computer network. This information can be stored for later use by the network management software application.

SUMMARY

In accordance with exemplary embodiments, a method for storing mesh data concerning a computer network is disclosed. Mesh information is produced concerning a mesh of nodes in the computer network. The mesh information indicates that an interface of the mesh is an external mesh interface, and this mesh information is stored.

A computer for storing data concerning a computer network is also disclosed. The computer includes a processor configured to produce mesh information concerning a mesh of nodes in the computer network. The mesh information indicates that an interface of the mesh is an external mesh interface. The computer can include a memory configured to store the mesh information.

An exemplary system for storing data concerning a computer comprises means for producing mesh information concerning a mesh of nodes in the computer network. The mesh information indicates that an interface of the mesh is an external mesh interface. The system also can include means for storing the mesh information.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION OF THE PREFERRED EMBODIMENTS

Figure 1:
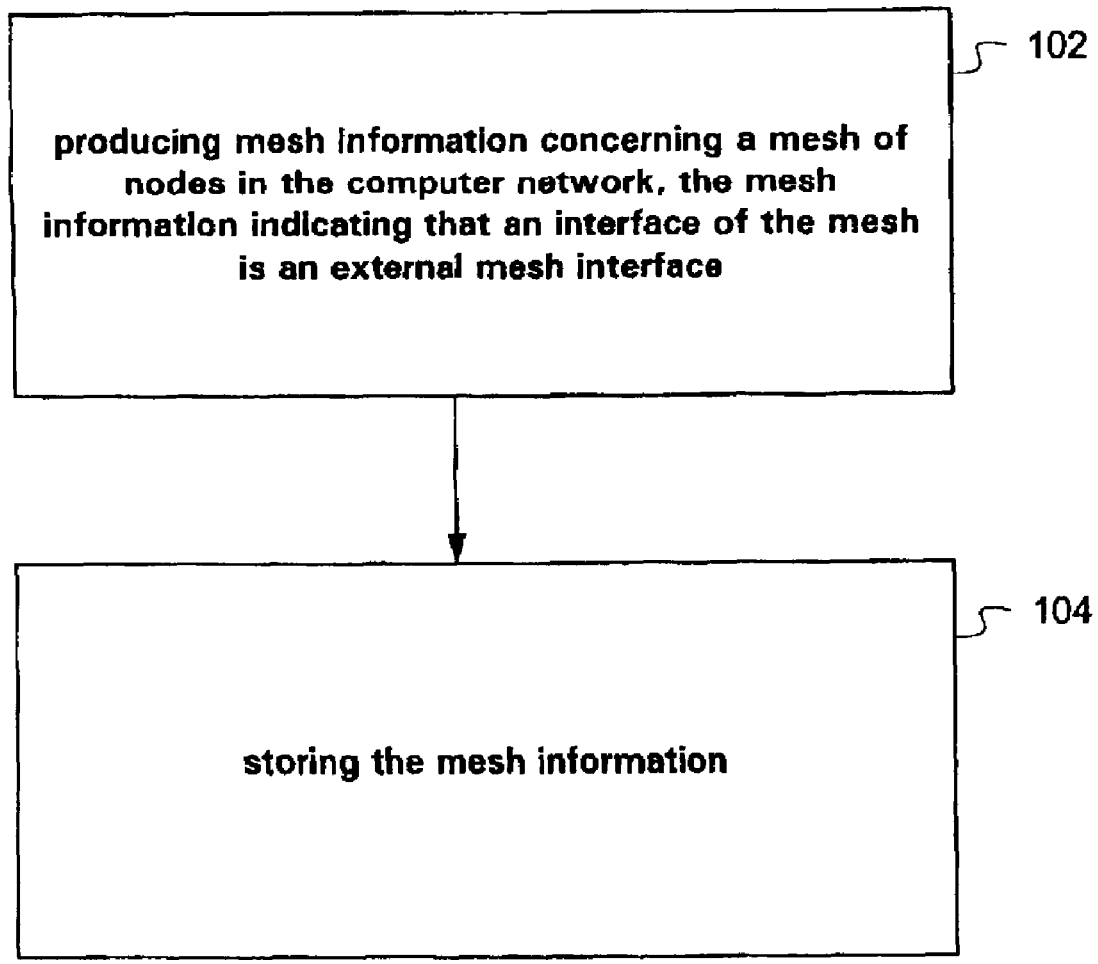
FIG. 1 is a flowchart illustrating a method for storing mesh data concerning a computer network of an exemplary embodiment.

FIG. 1 is a flowchart illustrating a method for storing mesh data concerning a computer network of an exemplary embodiment. In step 102, mesh information is produced concerning a mesh of nodes in the computer network. A mesh is a group of three or more nodes that are fully interconnected. The nodes can include, but are not limited to, end nodes; routing nodes, such as routers using IP addresses; and switching non-routing nodes, such as switches using link level addresses. As referenced herein, a "computer network" is any network or subnetwork that interconnects computers. In one example, the computer network is a subnetwork of switching, nonrouting nodes and the mesh is a fully connected group of switching, nonrouting nodes.

The mesh information indicates that an interface of the mesh is an external mesh interface. An external mesh interface is an interface of a node in the mesh that connects to a node that is not in the mesh. An internal mesh interface is an interface of a node in the mesh that only connects to a node(s) in the mesh.

In step 104, the mesh information is stored. The mesh information can be stored in a memory of any type.

Figure 2:
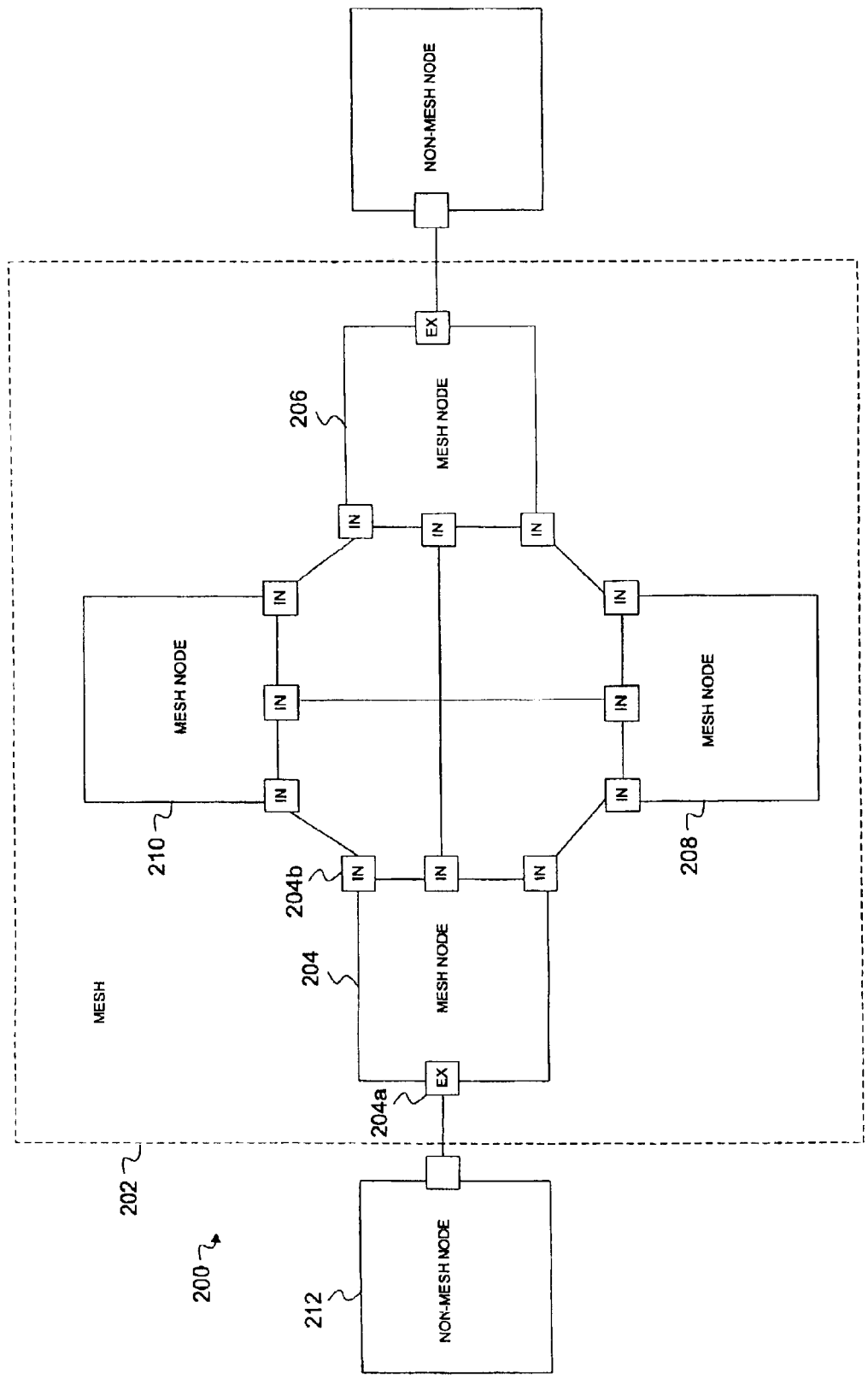
FIG. 2 is a diagram of an example mesh in a computer network illustrating internal and external mesh interfaces.

FIG. 2 is a diagram of an example mesh 202 in a computer network 200 illustrating internal and external mesh interfaces. The mesh 202 includes nodes 204, 206, 208 and 210 each of which connects to the other nodes of the mesh 202. The external mesh interface 204a connects to non-mesh node 212. The internal mesh interface 204b connects to mesh node 210, but does not connect to a non-mesh node.

Figure 3:
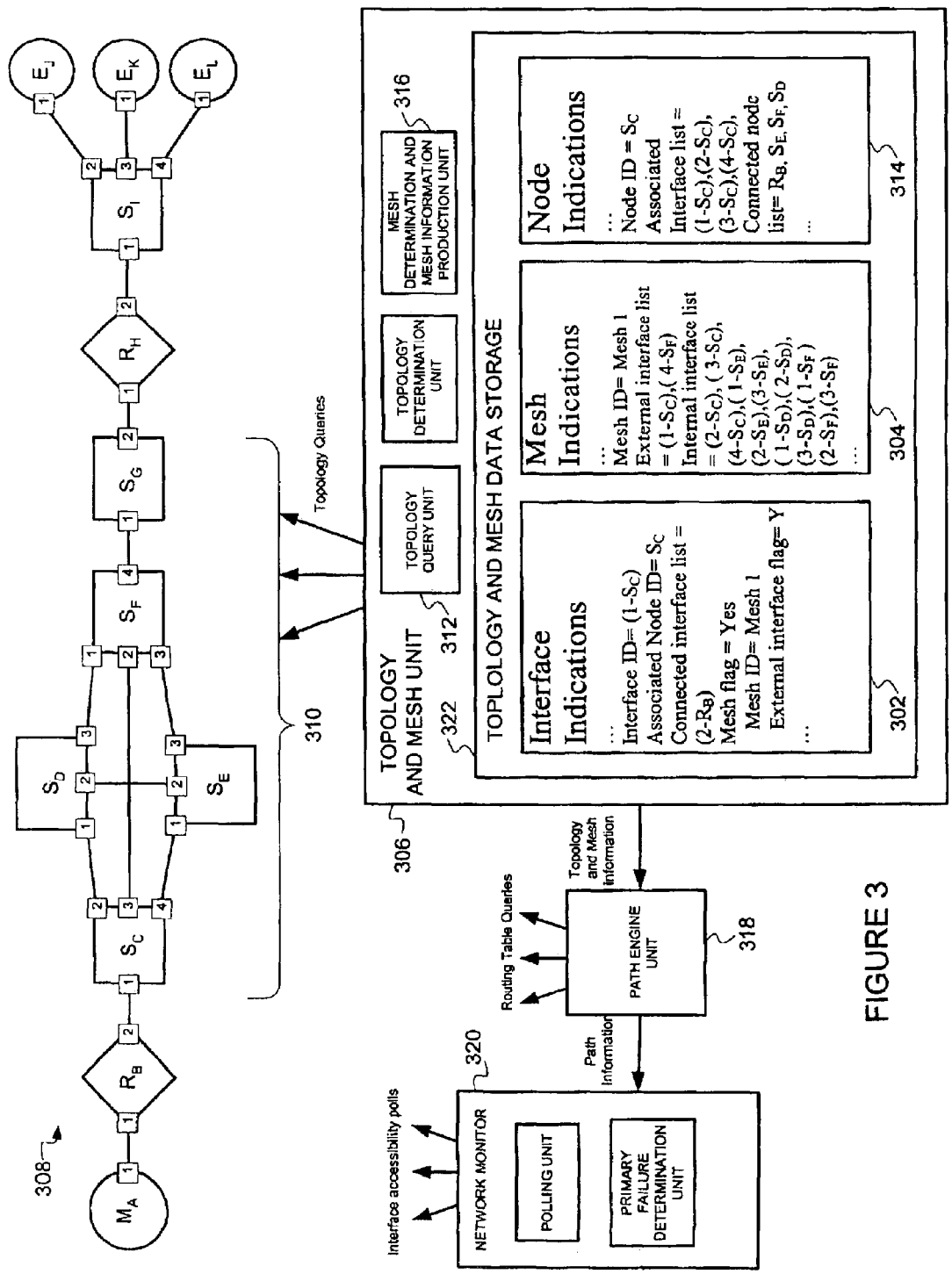
FIG. 3 is a functional diagram of a system of an exemplary embodiment.

In one embodiment, the mesh information is part of an interface indication, such as the interface indications 302 stored in the topology and mesh data storage 322 of FIG. 3. Having mesh information in an interface indication allows a client process, such as a path engine unit 318, to determine the external mesh interfaces. The mesh information can be contained within an external mesh interface field, such as the FIG. 3 "External interface flag" of the interface indications 302.

In an exemplary embodiment, the mesh information can alternately, and/or in addition, be part of a mesh indication, such as the mesh indications 304, that lists the external mesh interfaces of the mesh. The mesh indication 304 can also list the internal mesh interfaces of the mesh.

In one embodiment, the mesh is determined before the production of the mesh information. Examples of a method of determining a mesh in a computer network are described herein. Additional examples are provided in the U.S. patent applications, "METHOD OF DETERMINING A MESH IN A COMPUTER NETWORK", Walker et al., Ser. No. 10/355,062, and "METHOD OF DETERMINING A MAXIMAL MESH", Natarajan et al., Ser. No. 10/354,991, incorporated herein by reference in their entireties.

The mesh information can be used to produce a path indication. The path indication identifies the external mesh interface of the mesh. The path indication can be a path of interfaces between nodes in the computer network and can, for example, include an identifier of a mesh indication. The mesh indication identifies internal mesh interfaces of the mesh.

In one embodiment, the mesh information is used to determine multiple paths between two nodes. The mesh information can be used to produce a mesh indication which can include a list(s) of internal and external nodes. The mesh indication can be used to determine the multiple paths.

FIG. 3 is a functional diagram of a system according to an exemplary embodiment. In this example, mesh information indicates that interface 1 of node $S_C$ is an external mesh interface. This mesh information can be stored as part of the interface indications 302. Placing the mesh information in the interface indication allows for the mesh information to be easily accessed, for example during a critical path calculation. In one example, the interface indication includes a flag to indicate whether the interface is part of a mesh, an identifier of any mesh that the interface is a part of, and a flag to indicate whether the interface is an external mesh interface.

Mesh information can also be stored as part of the mesh indications 304. In one example, the mesh indications 304 include a list of external mesh interfaces.

In the FIG. 3 example, the topology and mesh unit 306 determines topology information concerning any or all of the computer network 308. In an exemplary embodiment, the topology and mesh unit 306 determines topology information about switching node subnetworks of the total computer network 308, such as computer network 310. The topology query unit 312 can produce topology queries to the interfaces in the computer network 308. In one example, these queries are Simple Network Management Protocol (SNMP) queries to a Management Information Bases (MIBs) associated with the interfaces.

Topology query responses can include information concerning the interface such as information about the node where the interface is located and information about other interfaces connected to the interface. Network nodes can act as containers that collect a set of related interfaces. These interfaces can, for example, be managed as a group and defined by a single SNMP agent.

From the interface information, node information concerning the connection of nodes can be determined. In the example of FIG. 3, information concerning the connections of the interfaces is collected. For example, interface "2" of $R_B$ connects with interface "1" of node $S_C$, and so on. This interface information can be collected in a manner to ensure that both interface "2" of $R_B$ indicates that it connects to interface "1" of node $S_C$ and interface "1" of node $S_C$ indicates that it connects to interface "2" of node $R_B$. This double-checking can avoid errors in a management information block (MIBs) stored, for example, at one of the interfaces.

The interface information can be received in any order. In FIG. 3, if and when a report from interface "1" of node $S_C$ indicates that it connects to interface "2" of node $R_B$, a record is produced saying that there is a potential connection between the two interfaces. Once a report is received from interface "2" of node $R_B$ confirming this connection, the interface connection can be indicated as being correct.

In one embodiment, the interface connections are stored as a list for each interface. An array of interface connection information lists can be created to allow the construction of node connection information. Once all desired interface connections are determined, node connections can be found.

In FIG. 3, node $S_C$ has interfaces "1", "2", "3" and "4". The interfaces to which the interfaces of node $S_C$ connect are then determined. In this case, the connected interfaces include interface "2" of node $R_B$, interface "1" of node $S_D$, interface "2" of node $S_F$ and interface "1" of node $S_E$. Indications of nodes $R_B$, $S_D$, $S_E$ and $S_F$ can be added to a node connection list, such as in the node indications 314. The list can also include indications of unconfirmed node connections (for example, where there is some partial evidence of a connection).

The mesh determination and mesh information production unit 316 can use the lists of the connected nodes to find the meshes in the computer network 310. The mesh determination unit 316 can start at node $S_C$ and go to the first indication in the list of connected nodes. In this case, the first indication in the list is node $R_B$. In one embodiment, only meshes of switching non-routing nodes are found. Since node $R_B$ is a routing node, it can be ignored. The next node indication in the list is node $S_E$. Nodes $S_C$ and $S_E$ form a fully connected group. The third connected node for node $S_C$ is node $S_F$. Node $S_F$ connects with both nodes $S_C$ and $S_E$, so node $S_F$ is added to the fully connected group. The final node in the connection list is node $S_D$. Since node $S_D$ connects with each of nodes $S_F$, $S_C$ and $S_E$, and there are no more nodes in the list of connected nodes, it is determined that nodes $S_D$, $S_F$, $S_C$ and $S_E$ are a maximal mesh. In an exemplary embodiment, a mesh is considered to be maximal when it includes a largest possible number of fully interconnected nodes (that is, there are no additional nodes which are fully connected to the nodes of the mesh).

One example of pseudocode for mesh determination using a list of connections is as follows:

```
Find All Switch Meshes
For all nodes,
  Get next current node
  Ensure that current node is valid and is a switch rather than
     a router
  Get list of nodes connected to current node
     Check each node in list for validity and to ensure that it
        is a switch
  If current node connected to two or more qualified nodes
     Run Recursive Clique Check (current node, current
        group, list of qualified connections, group changed
        indicator)
```

The Find All Switch Meshes procedure checks each node to ensure that the current node is valid and a switch rather than a router. In one embodiment, only switches are examined for membership in a mesh. The list of nodes connected to the current nodes is obtained. Each node in the list is checked for validity to ensure it is a switch. If the current node is connected to two or more qualified nodes, the Recursive Clique Check procedure included in the above pseudocode is run. An example of a procedure for the Recursive Clique Check, which can be used to identify the nodes of maximal meshes, is as follows:

```
Recursive Clique Check
(Test node
Current group
List of qualified connections
Group changed indicator)
if test node is not connected to every node in current group
   return
If no nodes are in list of qualified connections set terminate
   flag
else
   remove a node from list of qualified connections
   set removed node as the new node
   create new current group consisting of test node added to
      current
   group set group changed indicator if terminate flag set
   Terminate Mesh Recursion (new current group, group
      changed indicator)
```

Else
    Recursive Clique Check (new node, new current group, list of qualified connections, group changed indicator)
    if terminate flag set
        Terminate Mesh Recursion (current group, group changed indicator)
    Else
        Recursive Clique Check (new node, current group, list of qualified connections, group changed indicator)

When the Recursive Clique Check is first called, the current node is set as a test node. If the test node is not connected to every node in the current group, the recursive clique check returns. If there are no nodes in the list of qualified connections, a terminate flag is set. Otherwise, a node is removed from the list of qualified connections and the removed node is set as the new node. A new current group is created by adding the test node to the old current group. The group change indicator is set.

If the terminate flag is set, the procedure Terminate Mesh Recursion is called using the new current group rather than the old current group. Otherwise, the procedure Recursive Clique Check is called using the new current group rather than the old current group.

When either of these calls return, if the terminate flag is set, the Terminate Mesh Recursion Procedure is called using the current group rather than the new current group. Otherwise, the Recursive Clique Check is called using the current group rather than the new current group.

An example of a Terminate Mesh Recursion procedure used to identify a maximal mesh, is as follows:

Terminate Mesh Recursion
    (test group,
        group changed indicator)
    If test group size is less than three clear group change indicator
        return
    else
        if test group is a subset of a previous mesh clear group changed indicator
            return
        if previous mesh is a subset of test mesh
            replace previous mesh in set of meshes with test group
        else
            add test group to set of meshes Pursuant to the Terminate Mesh Recursion procedure, if the test group size is less than 3, the test group cannot be a mesh in an exemplary embodiment described herein. In this case, the group change indicator is cleared and the procedure returns. Otherwise, if the test group is a subset of a previous mesh, the group change indicator is cleared and the system returns. Meshes that are found that are subsets of other meshes are not added as the new mesh. If a previous mesh is a subset of the test group, the test group replaces the previous mesh in the set of meshes. Otherwise, the test group is added to the set of meshes. Once a mesh is found, the external mesh interfaces for the mesh can be determined.

In one example, each interface of each node of the mesh is examined to determine whether it connects to a node outside the mesh to determine whether the interface is an external mesh interface. In the example of FIG. 3, the connected interfaces lists of the interface indications 302 can be used to find external mesh interfaces. In the example of FIG. 3, the mesh of nodes $S_D$, $S_F$, $S_C$ and $S_E$ has the external mesh interfaces, $1-S_C$ and $4-S_F$.

An example of psuedocode for the determination of external node interfaces is as follows:

For each node in mesh
    For each interface in node
        For each connected interface in node connection list
            Get associated node of connected interface
            If associated node outside mesh
                Add interface to external mesh interface list
            Else;

Path engine unit 318 can use the mesh data to produce path information between nodes. The path engine unit 318 can be used to determine a path through larger computer network 308. For example, the path through interfaces $1-M_A$, $1-R_B$, $2-R_B$, $1-S_C$, $3-S_C$, $2-S_F$, $2-S_F$, $4-S_F$, $1-S_G$, $2-S_G$, $1-R_H$, $2-R_H$, $1-S_I$, $2-S_I$, and $1-E_J$ can be determined. Although the path engine unit 318 is described herein for purposes of understanding exemplary embodiments, additional features of an exemplary path engine unit are described in the U.S. patent application Walker, et al. "Method of Indicating a Path in a Computer Network", Ser. No. 10/355,002.

Once the path is determined, stored mesh data can be checked to see whether any of the connections in the path are part of a mesh. In this case, external mesh interfaces $1-S_C$ and $4-S_F$ of mesh 1 are in the path. That is, a portion of the path includes mesh 1 and the path indication can include an indication of mesh 1. For example, the path indication can be given by $1-M_A$, $1-R_B$, $2-R_B$, $1-S_C$\{mesh 1\}, $4-S_F$, $1-S_G$, $2-S_G$, $1-R_H$, $2-R_H$, $1-S_I$, $2-S_I$, and $1-E_J$, where \{mesh 1\} is an indication of the mesh. The external mesh interfaces, $1-S_C$ and $4-S_F$, of mesh 1 are shown in the path indication. The internal mesh interfaces need not be shown. In one embodiment, \{mesh 1\} includes lists of internal and external mesh interfaces, such as those shown in mesh indications 304 of FIG. 3.

In an exemplary operation of the path engine 318, the path engine 318 initializes, waits for the network topology to be found by the topology and mesh unit 306, creates a listen socket, and waits for instructions from the network monitor 320 to connect. Once a command is received from the network monitor 220, the path engine 318 awaits discovery of a new node by the topology and mesh unit 306. When a new node is determined, a list of the routing nodes in the computer network is obtained from the topology and mesh unit. In this example, the routing nodes include routing nodes $R_B$, and $R_H$, and the system computes a composite path to the routing nodes.

In one example, a route from a designated start node (e.g., $M_A$) to an end node (e.g., $E_J$) through the routing nodes is determined. For example, when a route to $E_J$ is produced, the path engine 318, using the IP address of the node $E_J$, checks the routing table at the management node $M_A$. This indicates the routing node $R_B$. The routing table of $R_B$ indicates the second routing node $R_H$. The routing table at the routing node $R_H$ indicates the node $E_J$. The determination of the next routing node in the path can be performed using management queries from the path engine 318 to the routing tables. Dynamic changes to the routing tables can be found using the path engine 318.

Along the route between each pair of routing nodes, such as between $R_B$ and $R_H$, non-routing nodes along a path are determined. These non-routing nodes can be determined by checking the topology and mesh unit 306. In the example of FIG. 3, the topology and mesh unit 306 can be examined to determine which nodes connect to the first node $R_B$. It is found that node $S_C$ is connected to $R_B$. Then it is determined which nodes are connected to $S_C$. These include nodes $S_D$, $S_E$ and $S_F$. The nodes that connect to these nodes that have not been found before include node $S_G$. The path segment $1\text{-}S_C$, $3\text{-}S_C$, $2\text{-}S_F$, $4\text{-}S_F$, $1\text{-}S_G$ and $1\text{-}S_G$ is determined between the routing nodes $R_B$ and $R_H$. Next it is determined whether there are any meshes in the path segment. In this example, an indication of mesh 1 (including the nodes $\{S_C, S_D, S_F, S_E\}$) can be inserted in the path information.

The network monitor 320 can be located at the management computer $M_A$. The path engine 318 can be located at the management computer $M_A$ or any desired node in the computer network, or a computer that can access the computer network. Topology and mesh unit 306 can be located at the management computer or at any desired location.

In the example of FIG. 3, the path information is provided to the network monitor 320. The network monitor 320 can use the path information to determine primary failures in the computer network 308. Information concerning the meshes in the path information can help determine primary failures. The network monitor 320 can poll interfaces in the larger computer network 308 to determine interface accessibility.

Information about the accessibility of each interface, as well as indications of the alternate paths through the non-routing nodes can be stored so that a correct determination of the point of primary failure can be made.

An example of a Determine Primary Failure procedure is as follows:

Determine Primary Failure
poll all of the interfaces in a computer network to determine accessible and inaccessible interfaces
if any interfaces are inaccessible, for each current inaccessible interface
if there is a path through accessible interfaces in the critical route to the current inaccessible interface, the failure is a primary failure
if there is not path through accessible interfaces in the critical route to the current inaccessible interface, the failure is a secondary failure In the example of FIG. 3, the accessibility of interfaces in the computer network is polled to determine those nodes which are accessible and inaccessible from any designated start nodes such as the management node $M_A$. For each inaccessible interface, it is checked (e.g., by sending queries to the interface) to determine whether there is a path through accessible interfaces to the inaccessible interface. When a path exists from the node $M_A$ to a particular inaccessible interface, the failure at the inaccessible interface is a primary failure. If there is no path from the node $M_A$ through accessible interfaces to a particular inaccessible interface, then the failure at the particular inaccessible interface is a secondary failure and a primary failure likely exists upstream (e.g., between the node $M_A$ and the inaccessible interface currently being considered).

In the example of FIG. 3, assume a failure at interface 3 of $S_C$ and a failure at interface 1 of $S_I$. A spanning tree in the non-routing nodes in between the routing nodes $R_B$ and $R_H$ can be used to avoid loops. The spanning tree can set a root node, such as node $S_F$. This root node runs the spanning tree algorithm and can turn off some of the interfaces. For example, the spanning tree algorithm can turn off interfaces 2 and 4 on switch $S_C$, turn off interfaces 1 and 2 on switch $S_D$, and turn off interfaces 1 and 2 on switch $S_E$.

Until the spanning tree is changed, the failure at the interface 3 of the switch $S_C$ is a primary failure since neither node $E_J$ nor any other interface in the path to node $E_J$ are accessible from $M_A$, while the interfaces 1 and 2 of $R_B$ as well as interface 1 of $S_C$ are accessible.

The spanning tree algorithm can thus determine the failure at interface 3 of $S_C$. The spanning tree algorithm can then produce a modified spanning tree, such as the spanning tree that connects $S_F$ to $S_D$ and then connects $S_D$ to $S_C$, rather than the direct connection between $S_C$ to $S_F$. When the spanning tree reroutes, the failure at interface 3 of $S_C$ is no longer a primary failure since additional interfaces in the path toward the second node $E_J$ are now accessible. For example, interface 2 of $S_C$, interfaces 1 and 3 of $S_D$, interfaces 1 and 4 of $S_F$, and interfaces 1 and 2 of $S_G$ are now accessible. Thus, interface 3 of $S_C$, once the spanning tree is rearranged, is not indicated as being a primary failure.

Because the path information indicates a mesh, different arrangements of the spanning tree can be anticipated. For example, a report of a primary failure at interface 3 of $S_C$ can be delayed since it is likely that the spanning tree algorithm will reconfigure around the interface 3 of switch $S_C$. Once the spanning tree routes around the failed interface 3 of $S_C$, the failure at interface 1 of $S_I$ is indicated as the primary failure (i.e., a failure which cannot be obviated via the spanning tree algorithm).

Distinguishing between internal and external mesh interfaces to the mesh can help identify primary failures. In the example FIG. 3, interface 3 of $S_C$ is an internal mesh interface of mesh 1. The failure of this interface can be avoided by reconfiguring the switching nodes (for example, in a new spanning tree).

Interface 1 of $S_C$ is an external mesh interface of the mesh. This external mesh interface cannot be avoided by reconfiguring the switches. When the computer network 310 uses a spanning tree algorithm and the failed mesh interface is in the current spanning tree, the spanning tree algorithm, can modify the spanning tree in an effort to avoid the failure at the interface for internal nodes of the mesh.

Figure 4:
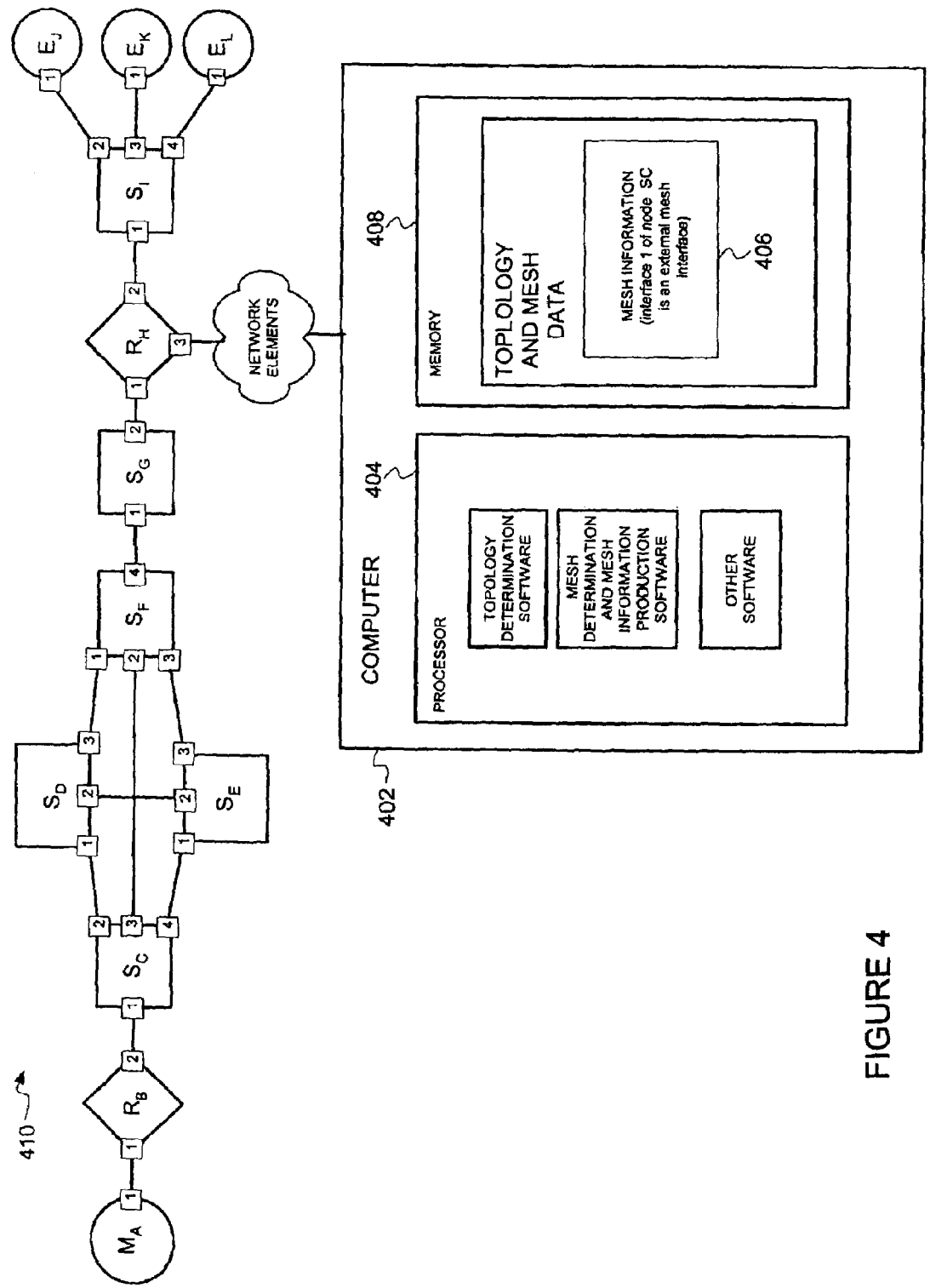
FIG. 4 is a functional diagram of a computer configured to store mesh data concerning a computer network.

FIG. 4 is a diagram that illustrates a computer system for storing data concerning a computer network of an exemplary embodiment. In the example of FIG. 4, computer 402 includes a processor 404. The processor 404 is configured to produce mesh information concerning a mesh of nodes in the computer network 410. The mesh information 406 indicates that an interface of the mesh is an external mesh interface. A memory 408 is configured to store the mesh information 406.

In one embodiment, the mesh information 406 is part of an interface indication. The mesh information can be contained within an external mesh interface field of the interface indication.

The mesh information can also be part of a mesh indication that lists the external mesh interfaces of the mesh. The mesh indication can also list the internal mesh interfaces of the mesh.

The processor 404 can be configured to determine the mesh; and to use the mesh information to produce a path indication. The path indication can identify the external mesh interface of the mesh. The path indication can include an identifier of a mesh indication, the mesh indication identifying internal mesh interfaces of the mesh. The processor can also be configured to use the mesh information to determine multiple paths between two nodes.

An exemplary system for storing data concerning a computer network such as the computer network 308 can include means, such as the topology and mesh unit 306, for producing mesh information concerning a mesh of nodes in the computer network. The mesh information indicates that an interface of the mesh is an external mesh interface. The mesh information production means can comprise a configured processor or computer, software or other means. The system also includes means, such as the topology and mesh data storage 322, for storing the mesh information. The storing means can include memory of any type. In one embodiment, the system includes the computer network 308, 410.

The system can include means for determining the mesh, such as the mesh determination unit 316. The mesh determining means can comprise a configured processor or computer, software or other means separate or the same as the mesh information production means.

The system can also include means, such as path engine unit 318, for using the mesh information to produce a path indication that identifies the external mesh interface of the mesh. The path indication can include an identifier of a mesh indication that identifies internal mesh interfaces of the mesh. The path indication production means can comprise a configured processor 404 or computer 402, software or other means separate or the same as the mesh information production means and/or the mesh determining means.

The system can include means, such as path engine unit 318, for using the mesh information to determine multiple paths between two nodes. The mesh information using means can comprise a configured processor 404 or computer 402, software or other means separate or the same as the mesh information production means, any mesh determining means and/or any path indication production means.

Figure 5:
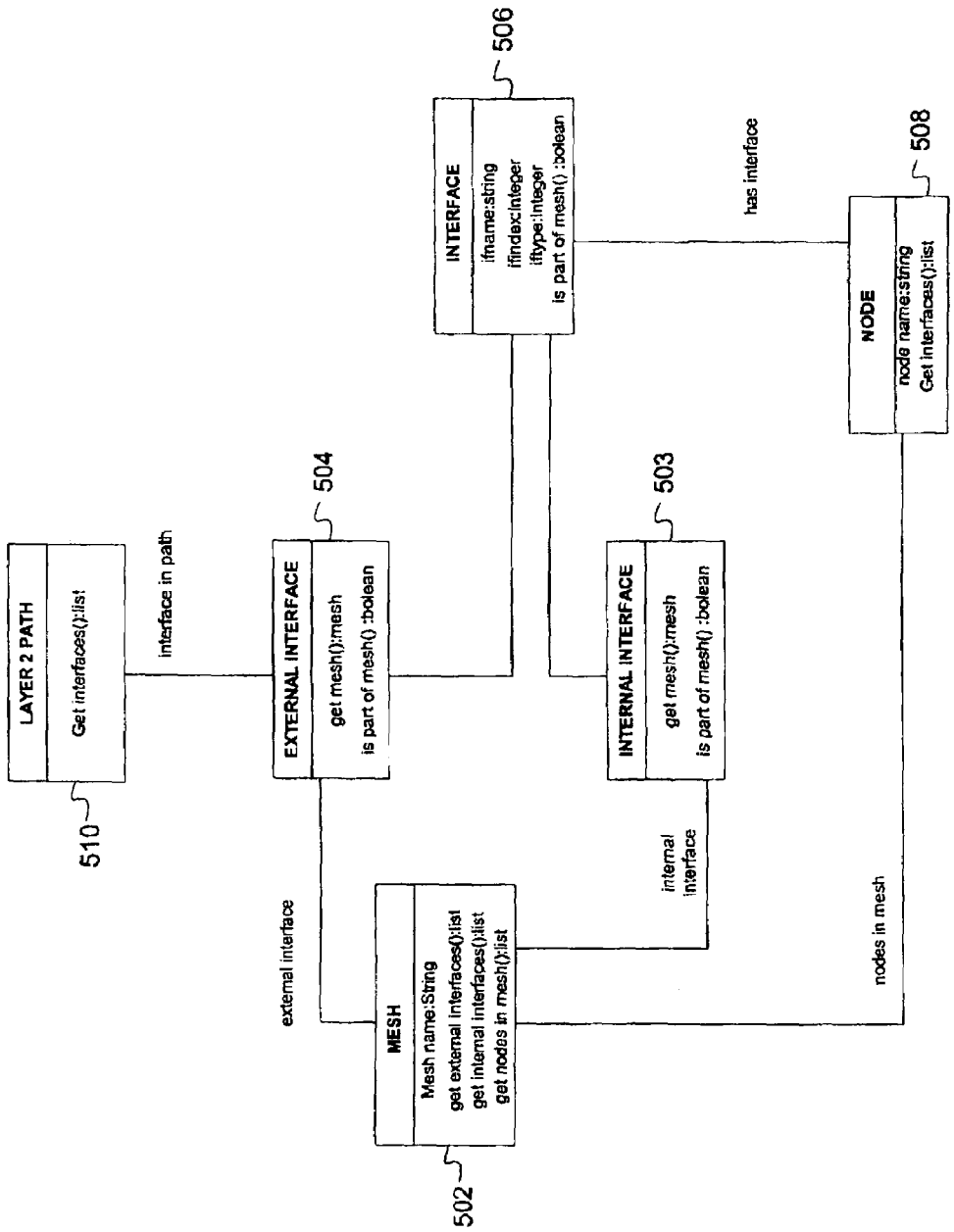
FIG. 5 is a diagram of a mesh data model of an exemplary embodiment.

FIG. 5 is a diagram of a mesh data model according to an exemplary embodiment. In the example of FIG. 5, mesh object 502 has a number of external and internal mesh interface objects 503 and 504 respectively. The mesh object 502 also includes a number of node objects 508. Each of the node object 508 has associated with it a number of interface objects 506. Each external and internal mesh interface objects 503 and 504 respectively is associated with a singe interface object 506. The layer 2 path object 510 can be associated with an external mesh interface object 504 part of a mesh object 502. The objects of FIG. 5 can be associated with function calls that can be implemented in any of a variety of ways to perform the processes described herein.

Exemplary embodiments are also directed to a computer readable medium for storing a computer program that performs the process of FIG. 1. For example, the computer program can be configured for producing mesh information concerning a mesh of nodes in the computer network 308, 410. The mesh information indicates that an interface of the mesh is an external mesh interface, and this information can be stored.

The mesh information can be part of an interface indication that indicates whether the interface is an external mesh interface of the mesh. The mesh indication can also indicate whether an interface is an internal mesh interface of the mesh.

The mesh can be determined (e.g., discovered) so that it can then be produced during execution of the FIG. 1 process. The mesh information can be used to produce a path indication, the path indication identifying the external mesh interface(s) of the mesh and, optionally, some or all of the internal mesh interfaces of the mesh. The path indication can also include an identifier of a mesh indication.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A method of storing data concerning a computer network, the method comprising:

producing mesh information concerning a mesh of nodes in the computer network, the mesh information comprising: a variable which denotes whether an interface of the mesh is an external mesh interface, or a list of external mesh interfaces;

storing the mesh information, and determining whether an interface of the mesh is an external mesh interface based on the variable or the list of external mesh interfaces, wherein the mesh is a group of three or more nodes of the computer network that are fully interconnected, wherein the external mesh interface is an interface of a node in the mesh that connects to a node that is not in the mesh, and wherein an internal mesh interface is an interface of a node in the mesh that only connects to the nodes in the mesh.

2. The method of claim 1, wherein the mesh information is part of an interface indication.

3. The method of claim 1, wherein the mesh information is part of a mesh indication that lists the external mesh interfaces of the mesh.

4. The method of claim 3, wherein the mesh indication also lists internal mesh interfaces of the mesh.

5. The method of claim 1, comprising:

determining the mesh before the producing of mesh information.

6. The method of claim 1, comprising:

using the mesh information to produce a path indication, the path indication identifying the external mesh interface of the mesh.

7. The method of claim 6, wherein the path indication includes an identifier of a mesh indication, the mesh indication identifying internal mesh interfaces of the mesh.

8. The method of claim 1, comprising:

using the mesh information to determine multiple paths between two nodes.

9. The method of claim 1, wherein the nodes of the mesh are all switching, nonrouting nodes.

10. The method of claim 1, wherein the nodes making up the mesh is a subset of the nodes making up the computer network, and wherein the subset of the nodes is less than the entirety of the nodes of the computer network.

11. The method of claim 1, wherein the mesh information further comprises a second variable which denotes an identity of a mesh which the interface belongs to.

12. A computer for storing data concerning a computer network, the computer comprising:

a processor configured to produce mesh information concerning a mesh of nodes in the computer network, the mesh information comprising a variable which denotes whether an interface of the mesh is an external mesh interface, or a list of external mesh interfaces; and a memory configured to store the mesh information, wherein the mesh is a group of three or more nodes of the computer network that are fully interconnected, wherein the external mesh interface is an interface of a node in the mesh that connects to a node that is not in the mesh, wherein an internal mesh interface is an interface of a node in the mesh that only connects to the nodes in the mesh, and wherein whether an interface of the mesh is an external mesh interface is determined based on the variable or the list of external mesh interfaces.

13. The computer of claim 12, wherein the mesh information is part of an interface indication.

14. The computer of claim 12, wherein the mesh information is part of a mesh indication that lists the external mesh interfaces of the mesh.

15. The computer of claim 14, wherein the mesh indication also lists internal mesh interfaces of the mesh.

16. The computer of claim 12, wherein the processor is configured to determine the mesh.

17. The computer of claim 12, wherein the processor is configured to use the mesh information to produce a path indication, the path indication identifying the external mesh interface of the mesh.

18. The computer of claim 17, wherein the path indication includes an identifier of a mesh indication, the mesh indication identifying internal mesh interfaces of the mesh.

19. The computer of claim 12, wherein the processor is configured to use the mesh information to determine multiple paths between two nodes.

20. The computer of claim 12, wherein the nodes of the mesh are all switching, nonrouting nodes.

21. The computer of claim 12,
wherein the nodes making up the mesh is a subset of the nodes making up the computer network, and
wherein the subset of the nodes is less than the entirety of the nodes of the computer network.

22. The computer of claim 12, wherein the mesh information further comprises a second variable which denotes an identity of a mesh which the interface belongs to.

23. A system for storing data concerning a computer network, the system comprising:
means for producing mesh information concerning a mesh of nodes in the computer network, the mesh information comprising a variable which denotes whether an interface of the mesh is an external mesh interface, or a list of external mesh interfaces;
means for storing the mesh information, and
means for determining whether an interface of the mesh is an external mesh interface based on the variable or the list of external mesh interfaces;
wherein the mesh is a group of three or more nodes of the computer network that are fully interconnected,
wherein the external mesh interface is an interface of a node in the mesh that connects to a node that is not in the mesh, and
wherein an internal mesh interface is an interface of a node in the mesh that only connects to the nodes in the mesh.

24. The system of claim 23, comprising:
the computer network including a mesh of nodes.

25. The system of claim 23, wherein the mesh information is part of an interface indication.

26. The system of claim 23, wherein the mesh information is part of a mesh indication that lists the external mesh interfaces.

27. The system of claim 26, wherein the mesh indication also lists an internal mesh interface.

28. The system of claim 23, comprising:
means for determining the mesh before producing the mesh information.

29. The system of claim 23, comprising:
means for using the mesh information to produce a path indication, the path indication identifying the external mesh interface of the mesh.

30. The system of claim 29, wherein the path indication includes an identifier of a mesh indication, the mesh indication identifying an internal mesh interface of the mesh.

31. The system of claim 29, wherein the means for using the mesh information determines multiple paths between two nodes.

32. The system of claim 23, wherein the nodes of the mesh are all switching, nonrouting nodes.

33. The system of claim 23,
wherein the nodes making up the mesh is a subset of the nodes making up the computer network, and
wherein the subset of the nodes is less than the entirety of the nodes of the computer network.

34. The system of claim 23, wherein the mesh information further comprises a second variable which denotes an identity of a mesh which the interface belongs to.

35. A computer readable medium for storing a computer program configured for:
producing mesh information concerning a mesh of nodes in the computer network, the mesh information comprising a variable which denotes whether an interface of the mesh is an external mesh interface, or a list of external mesh interfaces;
storing the mesh information, and
determining whether an interface of the mesh is an external mesh interface based on the variable or the list of external mesh interfaces;
wherein the mesh is a group of three or more nodes of the computer network that are fully interconnected,
wherein the external mesh interface is an interface of a node in the mesh that connects to a node that is not in the mesh, and
wherein an internal mesh interface is an interface of a node in the mesh that only connects to the nodes in the mesh.

36. A computer readable medium of claim 35, wherein the mesh information is part of an interface indication.

37. A computer readable medium of claim 35, wherein the mesh information is part of a mesh indication that lists the external mesh interfaces of the mesh.

38. A computer readable medium of claim 37, wherein the mesh indication also lists internal mesh interfaces of the mesh.

39. A computer readable medium of claim 35, wherein the program is configured for:
determining the mesh before the producing of mesh information.

40. A computer readable medium of claim 35, wherein the program is configured for:
using the mesh information to produce a path indication, the path indication identifying the external mesh interface of the mesh.

41. A computer readable medium of claim 40, wherein the path indication includes an identifier of a mesh indication, the mesh indication identifying internal mesh interfaces of the mesh.

42. A computer readable medium of claim 40, wherein the program is configured for: using the mesh information to determine multiple paths between two nodes.

43. The computer readable medium of claim 35, wherein the nodes of the mesh are all switching, nonrouting nodes.

44. The computer readable medium of claim 35,
wherein the nodes making up the mesh is a subset of the nodes making up the computer network, and
wherein the subset of the nodes is less than the entirety of the nodes of the computer network.

45. A computer readable medium of claim 35, wherein the mesh information further comprises a second variable which denotes an identity of a mesh which the interface belongs to.

* * * * *